Figure 1:
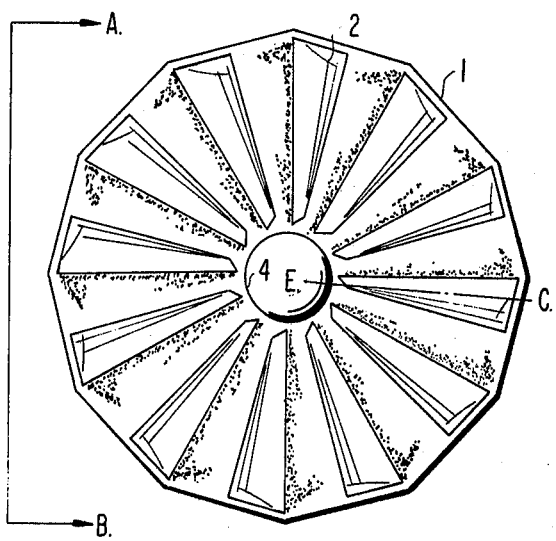

United States Patent [19]

Ricafranca et al.

[11] 4,078,382
[45] Mar. 14, 1978

[54] METHOD AND APPARATUS FOR DERIVING USEFUL ENERGY FROM SEA WAVES

[76] Inventors: Romulo M. Ricafranca, 749 Ates St. Sta. Mesa, Manila; Amancio S. Donato, 140 Kaingin Road, San Francisco del Monte, Quezon City, both of Philippines

[21] Appl. No.: 551,448

[22] Filed: Feb. 20, 1975

[30] Foreign Application Priority Data

Feb. 20, 1974 Philippines .............................. 15528

[51] Int. Cl.² .............................................. F16D 31/02
[52] U.S. Cl. ........................................ 60/398; 60/407; 60/412; 60/497; 290/53; 416/197 A
[58] Field of Search .................... 290/42, 53; 417/100, 417/240; 416/6, 20, 64, 175; 60/398, 407, 412

[56] References Cited

U.S. PATENT DOCUMENTS

| 990,546 | 4/1911 | Gross | 416/64 |
|---|---|---|---|
| 1,388,042 | 8/1921 | Hunter | 416/64 |
| 1,448,029 | 3/1923 | Larry et al. | 290/42 |
| 1,954,143 | 4/1934 | Morrison | 416/64 |
| 3,064,137 | 11/1962 | Corbett et al. | 290/53 |
| 3,200,255 | 8/1965 | Masuda | 290/53 |
| 3,912,938 | 10/1975 | Filipenco | 290/53 |

FOREIGN PATENT DOCUMENTS

| 2,507,330 | 8/1975 | Germany | 290/53 |
|---|---|---|---|
| 1,015,119 | 12/1965 | United Kingdom | 290/53 |

*Primary Examiner*—Robert K. Schaefer
*Assistant Examiner*—John W. Redman
*Attorney, Agent, or Firm*—Sughrue, Rothwell, Mion, Zinn and Macpeak

[57] ABSTRACT

A sea wave powered electrical generating apparatus includes converging dams 9 to funnel and amplify wave energy, a pressure chamber 8 having an entrance/exit gate 11 and a turbine rotor disposed on a vertical axis above the pressure chamber. The arcuate zig-zag configuration of the turbine blades coupled with windows 3 at the tops and bottoms of the blades results in a double action mode of continuous rotation as the wave surges pass up through and back down through the rotor.

1 Claim, 6 Drawing Figures

METHOD AND APPARATUS FOR DERIVING USEFUL ENERGY FROM SEA WAVES

This invention relates to energy transformation in general, and more particularly directed to a method and apparatus for transforming the energy of seawave motion to useful energy in the form of electrical power generation.

Sea waves represent a virtually infinite source of energy which if converted to a usable form could serve manifold utilitarian purposes. In this regard, the waves are capable of producing surges through a substantial height. The product of the weight of the water surge and the displacement represent work, and hence energy, which, it will be appreciated, may be substantial where the weight is of the order of thousands of tons and the height of the waves is of the order of feet. Of course, the potential energy of the surge is not of useful form. In order to use this substantial undepletable source of energy, the energy must be transformed to shaft rotation, or another form suited to the driving of generators, etc.

In accordance with the present invention there is provided a method and apparatus for generating electrical power by tapping the wave impulses of the ocean. The method consists of three steps, namely: wave amplitude magnification; surge production; and pneumatic power production. The apparatus consists of three elements, namely: a dam, a pressure chamber, and a double-acting turbine.

The primary object of this invention is thence to provide a method and an apparatus for transforming directly and immediately the vast potential energy of seawaves to a useful form using a minimum number of parts.

Another object is to provide a direct and immediate transformation of reciprocating motion to rotary motion to obtain high efficiency.

Yet another object is to provide a means to concentrate the energy of the waves for utilization purposes.

And yet another object is to obtain pneumatic power out of wave surges.

This invention possesses other objects and features of advantage, some of which, with the foregoing will be set forth in the following description of the preferred form of the invention which is illustrated in the drawing accompnying and forming part of the specification. It is understood, however, that variations in the drawing and descriptions may be adopted within the scope of the invention as set forth in the claims.

Figure 6:
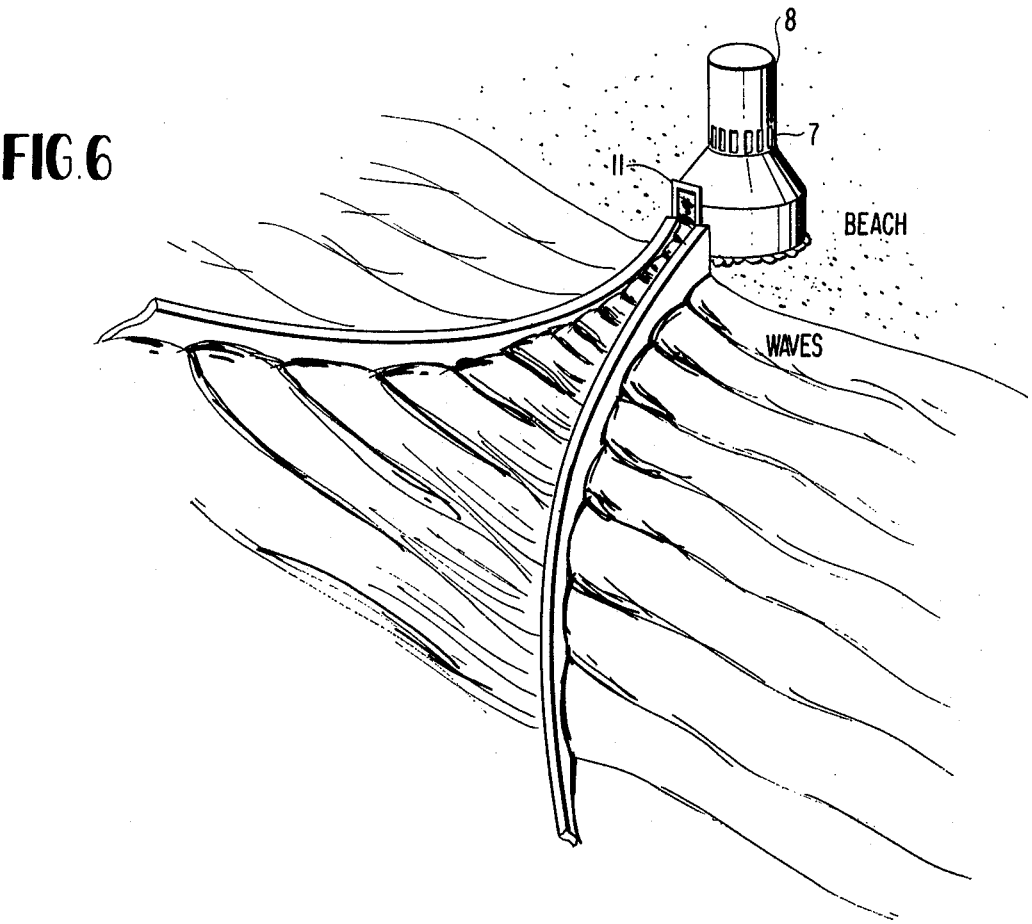

FIG. 1 — is the top view of the turbine employed in the power plant of FIG. 6.

Figure 2:
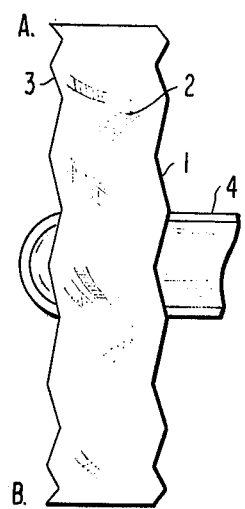

FIG. 2 — is the side view of the turbine.

Figure 3:
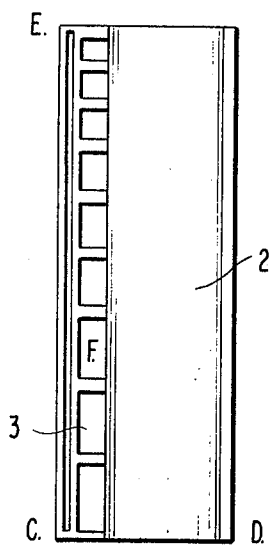

FIG. 3 — is a magnified view of one blade of the turbine.

Figure 4:
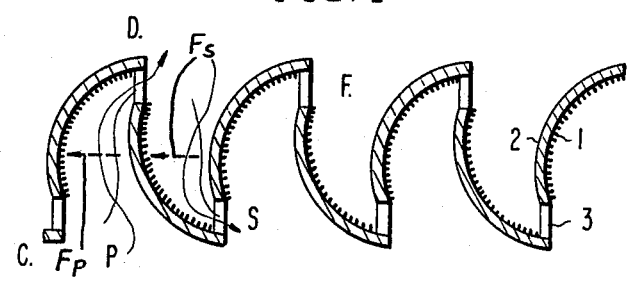

FIG. 4 — is a vertical sectional view of a portion of the turbine of FIG. 1 showing the angle of twist of each blade, and the blades arranged in series.

Figure 5:
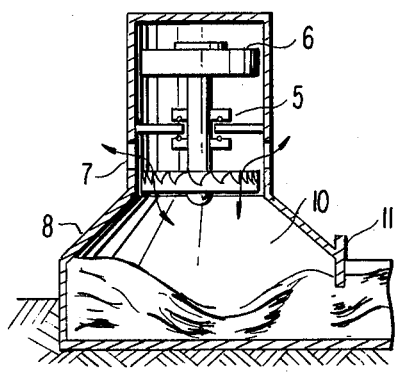

FIG. 5 — is the pressure chamber and the arrangement of the turbo-generator.

FIG. 6 — is a perspection view of the power plant of the present invention.

Referring now to FIG. 6, there is shown a dam 9 having a wide open mouth as entrance and an inwardly tapering waterway that terminates into an enclosed cylindrical pressure chamber 8 through gate 11. Inside the chamber 8 is a double-acting turbine (FIGS. 1, 2, 3, 4), assembled as shown by FIG. 5.

As can be seen from FIG. 6, the waves that enter the dam 9 will pass to a wide open area in front of the dam, and due to the contour of the dam's entrance, or waterway, said incoming waves will be amplified and magnified at the narrow portion terminating at gate 11.

The amplified and magnified waves have an enormous pressure power to active a standing wave that fluctuates inside the chamber 8. The standing wave is transformed to a surge producing, as a result, compression and suction pressure within the chamber, hence, the pneumatic power 10. This pneumatic power is aided by atmospheric pressure through window 7 of chamber 8.

For short, chamber 8 acts as a huge piston chamber with the wave surge as piston head. As in a Pascal's vessel, the dam serves as one piston, and the chamber as the other piston. That is, as sea water is pumped by the horizontal component of the wave into a pressure chamber, the action of the pumped water causes the standing wave inside the chamber to discharge surges under high pressure.

Because chamber 8 is nozzled in shape, the velocity of the pneumatic discharge and suction is further multiplifed. A multiplied pneumatic velocity contains so much energy which, with a wind turbine device, could produce rotary motion, and hence, shaft power.

In the apparatus, the first element involves a dam 9 as shown in FIG. 6, that is adopted to control the waves, said dam is usually wider at the entrance than at the discharge end because said dam must converge wave motion at its converging point.

The dam makes possible wave magnification because any fluid, when tunneled, attains higher velocity and pressure.

The pressure chamber 8 acts like a huge piston chamber, where the surges produced by the magnified and concentrated wave act as the piston head. This means that even though the horizontal component of the wave is small compared to the vertical component, such horizontal component, accumulated by the dam, can trigger great surges within chamber 8. It is noted that whenever a surge is produced within a confined vessel, comprission and suction naturally ensue. With proper nozzling effects, pneumatic power is present which is virtually the transformed power of the surges resulting from the actuation of the standing wave by the kinetic energy of the waves at the dam.

This pneumatic power is ultilized through a double-acting turbine meant to transform said power to shaft power. The turbine is shown by FIGS. 1, 2, 3, 4 and 5. One side 2 of the turbine blade is very smooth, and the other 1 very rough. This is necessary for efficiency purposes. The blades of the said turbine are preferrably arched through a quarter of a circle. Such arching makes possible a high speed rotation. As shown by FIG. 4, tangential force is obtained through compression by a component of the force acting at essentially at right angles to the axis of turbine rotation indicated by the dotted line arrow $F_p$ resulting from the air flow under surge pressure passing between the first and second blades, FIG. 4, from the left side of the illustrated array, The recession of the ocean water from the pressure chamber 8 causes a pneumatic suction effect and thus air rushes through the windows 7 of chamber 8 in a reverse direction between given sets of blades to exit through blade openings 3, FIG. 3, FIG. 4, also producing a component of force acting on the blade array of the turbine at right angles to the axis of rotation of the turbine and in the same direction as force $F_p$ due to the pressure portion of the surge, this component of the force acting to continue to drive the turbine in a given direction is indicated by the dotted arrow $F_s$. Similar suction and pressure forces act on the blades to provide additive forces of significant magnitude for always driving the turbine in the same direction. Suction force is smaller, but could become almost as great as compression through a revised angling of blades relative to suction utilization. No blade arrangement of this kind is yet in existence, and hence, could be named after the inventors according to standard procedure.

Because wave surges are impulsive, it is expected that the turbine rotation is also impulsive. Devices to make this motion uniform are standard and always available.

The turbine may be coupled directly to a generator through devices which are standard and always available.

We claim:

1. An apparatus for converting ocean wave motion into useful energy, said apparatus comprising:

a converging horizontal dam open to the ocean for magnifying the amplitude of sea waves and terminating in an exit portion;

a pressure chamber coupled to said exit portion and rising vertically to form a pneumatic chamber portion above the ocean water received from said dam, whereby a standing wave is maintained within the pressure chamber and transformed to a surging wave by normal wave motion and to thereby effect cyclic compression and suction of the air within the pressure chamber above the standing wave;

a double-acting air turbine operatively mounted within said pressure chamber above the ocean wave therefor for transforming pneumatic suction and compression pressure of the air resulting from the wave surge into mechanical energy;

window means within said pressure chamber above said double-acting turbine for permitting air flow to and from said double-acting turbine;

and wherein said double-acting turbine comprises a shaft mounted for rotation about a vertical axis within said pressure chamber, a plurality of arcuate turbine blades extending radially outwardly of the vertical shaft, being connected at their edges to form a serpentine configuration in vertical cross-section with alternating blades having horizontal openings adjacent their upper edges and other alternating blades having openings adjacent their bottom edges, and wherein adjacent blades are angled with respect to each other such that both during compression and suction of the air within said pressure chamber, additive force components are transmitted through the blades for rotation of the turbine in a given direction.

* * * * *